United States Patent Office

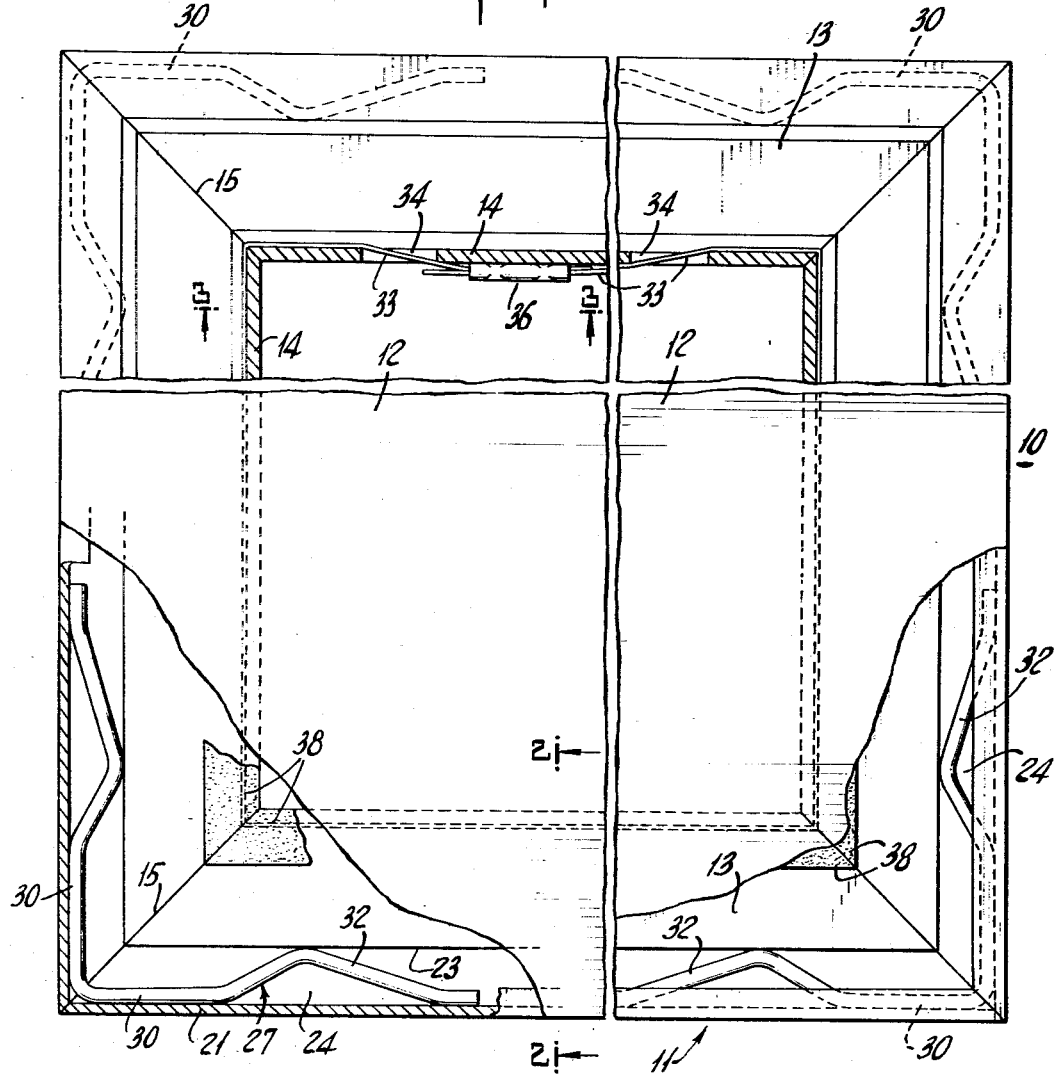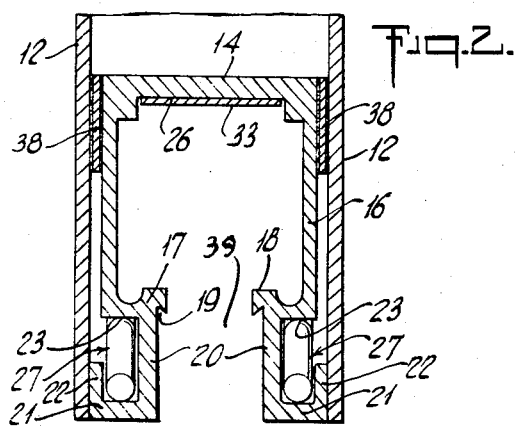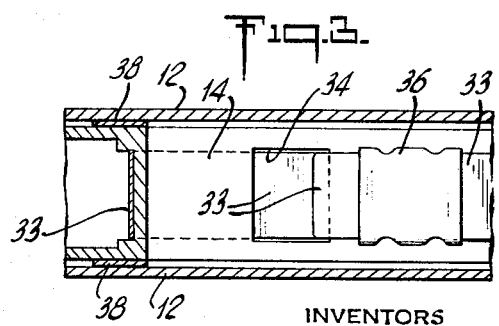

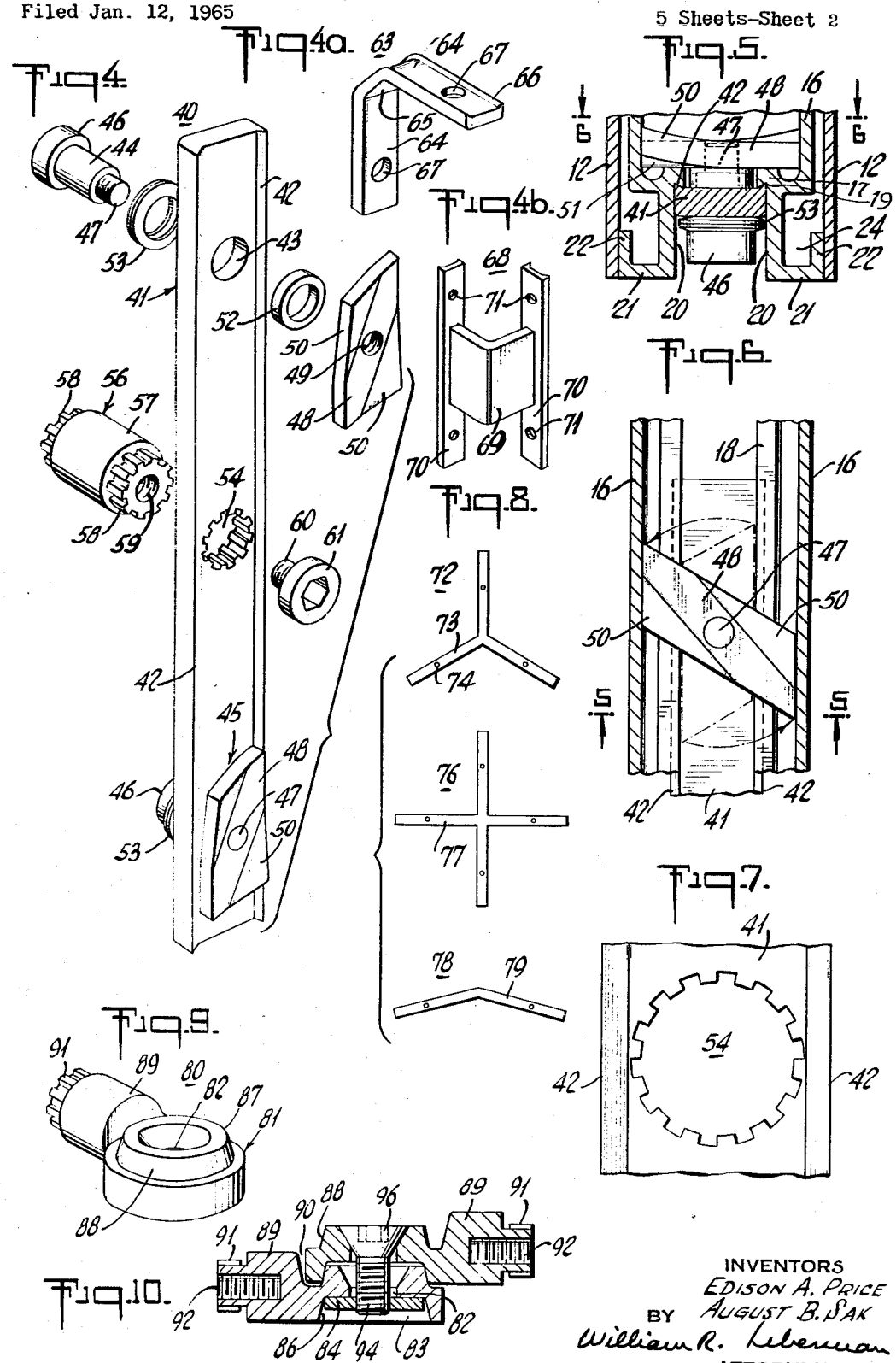

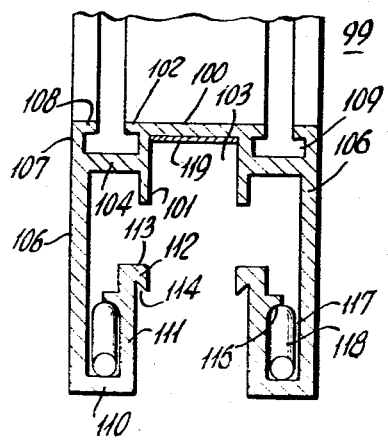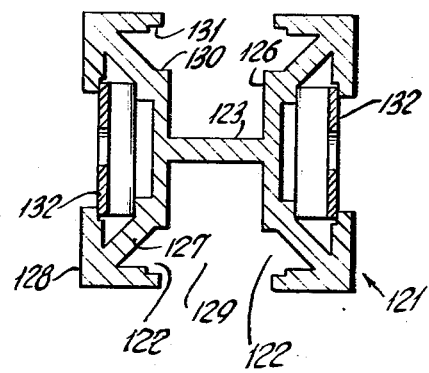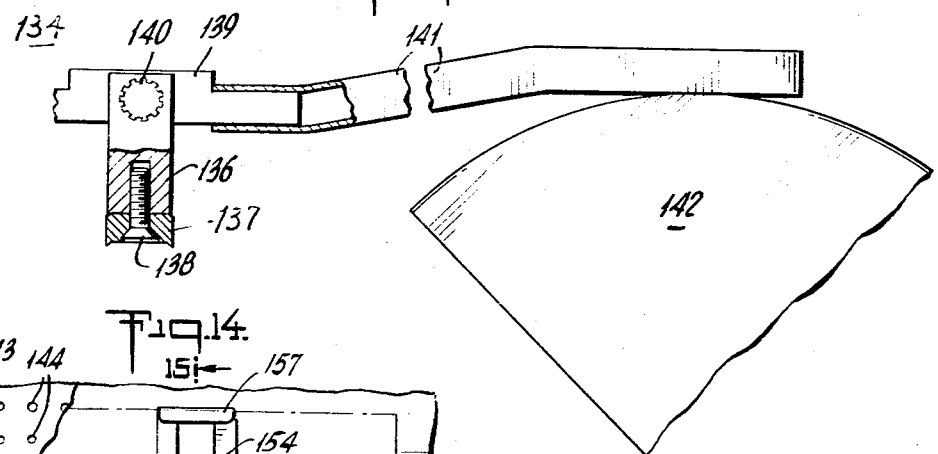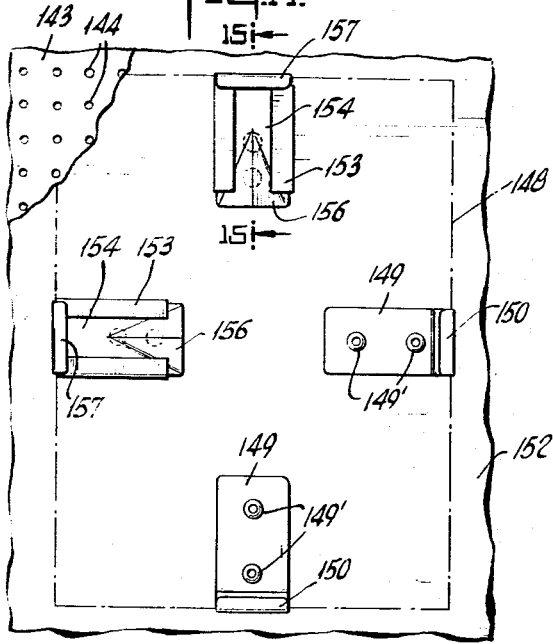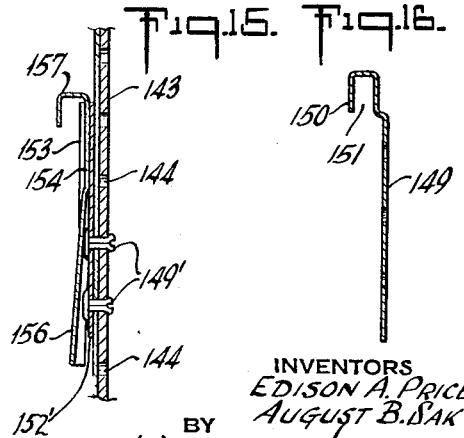

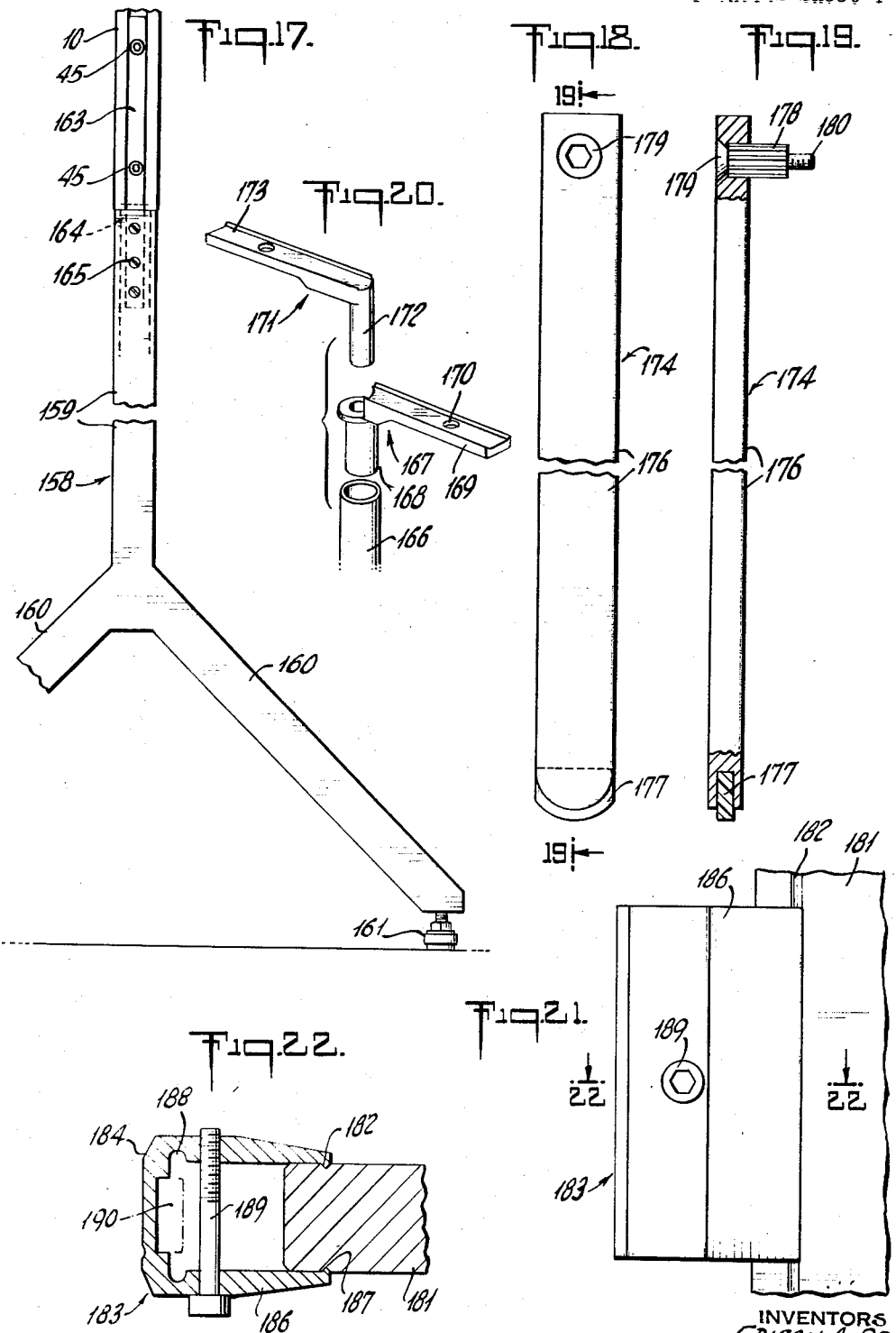

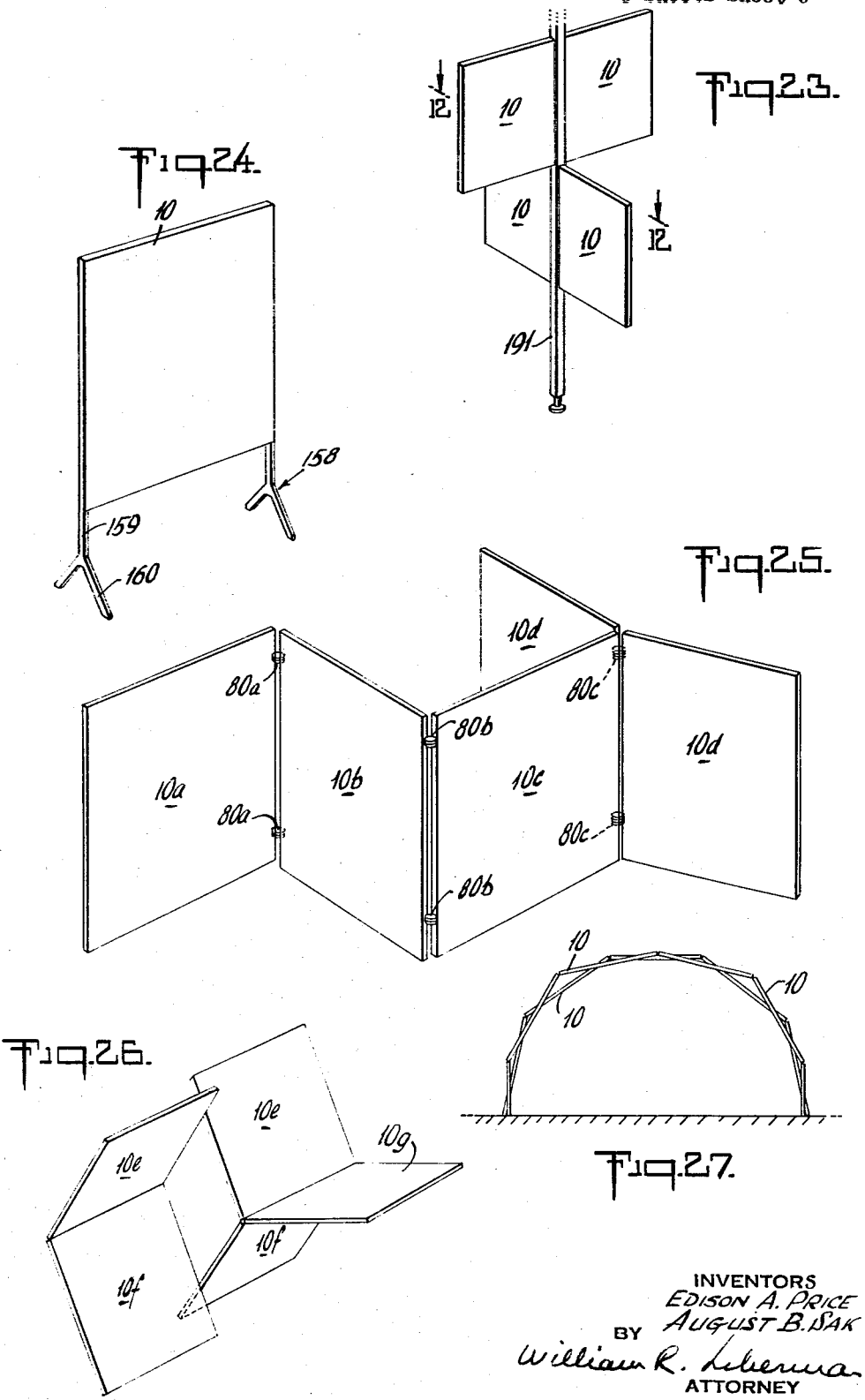

3,356,403
Patented Dec. 5, 1967

3,356,403
MODULAR CONSTRUCTION AND SUPPORT MEANS THEREFOR
August B. Sak, 23 W. 85th St. 10024, and Edison A. Price, 17 King St. 10014, both of New York, N.Y.
Filed Jan. 12, 1965, Ser. No. 424,975
11 Claims. (Cl. 287—189.36)

The present invention relates generally to improvements in structural units and assemblies and it relates in particular to an improved modular system for the construction, assembly and erection of structures for display or other purposes.

Structures in which one or more panels or frames of triangular, rectangular or of other polygonal shape (three or more sides) are assembled and supported in various relationships and positions are employed for many purposes and functions, among which are display, exhibition and decorative purposes. Generally, the various panels are assembled into the desired structure by the use of conventional fastening and coupling arrangements, a practice which possesses many drawbacks and disadvantages. The construction and assembly is usually highly time consuming and requires the use of highly skilled labor at the reaction site which is usually the point of the exhibit, and thus is very costly. Practical considerations limit the variety of structures which may be produced by conventional methods, and after a specific structure has served its function it is ordinarily of little further use since its disassembly is equally difficult and expensive and the disassembled structural units and components are all too often damaged and rendered unsuitable for further use. While prefabricated panel structures have been proposed and available these are of very limited application, are unadaptable and of little versatility, and otherwise leave much to be desired.

It is, therefore, a principal object of the present invention to provide an improved modular structural system.

Another object of the present invention is to provide an improved modular system for the assembly and erection of one or more panels, frames, light boxes, display shelves, etc.

Still another object of the present invention is to provide an improved modular panel system which permits the assembly and erection of a plurality of prefabricated panel units in an almost limitless variety of structures and arrangements.

A further object of the present invention is to provide an improved modular panel structure which may be rapidly and easily assembled or disassembled, the modular components compactly and safely stored and packaged, and thereafter reassembled to the configuration of the original structure or any other desired structure.

Still a further object of the present invention is to provide an improved modular panel or frame unit.

Another object of the present invention is to provide improved coupling units highly useful for the assembly of modular panels or frames.

Still another object of the present invention is to provide components and auxiliary devices which are readily coupled to the present modular panel unit.

A further object of the present invention is to provide a modular panel system of the above nature characterized by its ruggedness, attractive appearance, simplicity, flexibility, versatility, low cost and ease of use.

The above and other objects of the present invention will become apparent from a reading of the following description taken in conjunction with the accompanying drawings, wherein:

FIGURE 1 is a fragmentary front elevational view, partially in section, of a modular panel unit embodying the present invention;

FIGURE 2 is a sectional view taken along line 2—2 in FIGURE 1;

FIGURE 3 is a sectional view taken along line 3—3 in FIGURE 1;

FIGURE 4 is an exploded perspective view of one form of a coupling member in accordance with the present invention;

FIGURE 4a is a perspective view of an element of a modified coupling member;

FIGURE 4b is a perspective view of an element of another modified coupling member;

FIGURE 5 is a transverse sectional view of a panel frame leg and a coupling member releasably locked therein, taken along line 5—5 in FIGURE 6;

FIGURE 6 is a sectional view taken along line 6—6 in FIGURE 5;

FIGURE 7 is a fragmentary plan view of an intermediate section of the mounting bar of the coupling element of FIGURE 4;

FIGURE 8 is a series of plan views of different forms of coupling member mounting bars;

FIGURE 9 is a perspective view of an improved connector element in accordance with the present invention;

FIGURE 10 is a longitudinal sectional view of a pair of the connector elements of FIGURE 9 illustrated in assembled mated position;

FIGURE 11 is a transverse sectional view of a leg of a modified panel frame;

FIGURE 12 is a cross section of a typical support post onto which panels can be mounted, taken along line 12—12 in FIGURE 23;

FIGURE 13 is a fragmentary side view, partially in section, of a lighting unit and coupling assembly in accordance with the present invention;

FIGURE 14 is a fragmentary front elevational view of a modified panel structure provided with support clips or brackets;

FIGURE 15 is a sectional view taken along line 15—15 of FIGURE 14;

FIGURE 16 is a longitudinal sectional view of a fixed panel support bracket of FIGURE 14;

FIGURE 17 is a fragmentary side elevational view of a support stand mounting a panel unit;

FIGURE 18 is a fragmentary elevational view of a support leg provided with a connecting element facilitating its use with a panel unit;

FIGURE 19 is a sectional view taken along line 19—19 in FIGURE 18;

FIGURE 20 is a fragmentary exploded front perspective view of a support assembly for one panel or for a pair of panel units;

FIGURE 21 is a fragmentary front elevational view of another embodiment of the present invention;

FIGURE 22 is a sectional view taken along line 22—22 in FIGURE 21;

FIGURES 23 to 26 are perspective views illustrating examples of some connections possible employing the present improved modular systems; and FIGURE 27 is an end elevational view of another such structure.

In a sense, the present invention contemplates the provision of a modular structure comprising a polygonal frame member having channels formed in the side faces thereof and a coupling member registerable with and adjustable along the length of a channel and provided with means for releasably locking said coupling member in a preset position along said channel. Among important features of the present structure, which may be employed to great advantage, are the configuration and proportions of the sides of the frame and the various coupling and connector members associated and cooperating therewith. The frame sides are advantageously channel members having longitudinally extending flanges directed toward each other from opposite legs of the channels and are arranged with their ends in abutting engagement. Longitudinal seating channels are formed in the frame sides and adjacent of these seating channels are engaged by angular spring clips provided with legs registering with corresponding seating channels. A locking assembly band encircles the frame and tightly engages the channel member cross webs.

The coupling member advantageously includes a mounting bar which engages the outer face of a pair of channel flanges and rotatably carries one or more locking cams which releasably engage the inner faces of the corresponding flange. The mounting bar carries one or more connecting elements which may be other mounting bars in predetermined relationships or may be a rotatably adjustable post carrying a fastener element which may angularly and adjustably engage another similar fastener element. In accordance with the present invention, the fastener element is in the form of an annulus having an axial bore provided with an inwardly tapered face adjacent one end thereof and a frusto-conical axial projection adjacent the other end having an outer surface mating the tapered surface of the bore. Two or more of the annular fastening elements can be stacked and releasably locked by an axial nut and bolt.

Panels, per se, may be secured to panel frames in any suitable fashion and a pair of parallel transversely spaced panels are usually provided in each panel unit. Support posts and legs are provided with means for engaging the coupling members and various auxiliary components are provided, such as connector-carrying lighting fixtures, auxiliary panel brackets, etc., which result in a modular structural system permitting an almost endless variety of structural combinations of different appearances and applications.

Referring now to the drawings and more particularly FIGURES 1 to 7 thereof which illustrate a preferred embodiment of the present invention, reference numeral 10 generally designates the improved modular panel unit which, though illustrated as being of square configuration may be of any desired polygonal shape, for example, triangular, hexagonal, etc., as will be readily understood. Panel unit 10 includes a rectangular frame 11 which supports along the outer faces of the sides thereof a pair of transversely spaced parallel rectangular panel facings 12 which are formed of any suitable material, for example, wood, fiberboard, plastic sheet and the like and colored and decorated or carrying any desired decoration, information, data or display material. Sandwiched between the paired facings is any suitable core material to impart rigidity and stiffness to the units.

Frame 11 is formed of and defined by four channel shaped side elements 13 which lie in a common plane and have adjacent elements perpendicular to each other, the ends of said sides 13 being mitered, as at 15, and in end-to-end abutting engagement. Channel sides 13 are of uniform transverse cross-section, and advantageously of an extruded metal such as aluminum, each including a rear cross web 14 and forwardly directed, similarly shaped parallel side legs 16 perpendicular to cross web 14. Directed toward each other from opposite side legs 16, slightly rearwardly of the free ends thereof, are a pair of longitudinally extending flanges 17. Each flange 17 includes coplanar rearwardly facing shoulders 18 spaced inwardly from the inside faces of the corresponding legs 16 and have formed in the forward faces thereof longitudinally extending grooves 19 of triangular transverse cross section, which define a trackway.

Projecting forwardly from flanges 17 adjacent grooves 19 are a pair of parallel longitudinally extending strips 20 provided at their outer forward ends with opposite outwardly directed arms 21 which terminate in rearwardly projecting fingers 22. The outer faces of the fingers 22 are flat and lie in planes slightly outside those of the outside faces of the legs 16. The inner faces of elements 20, 21, and 22 and forwardly facing shoulders 23 located along the rear outside faces of corresponding strips 20 define longitudinally extending coupling or seating grooves 24. A shallow, longitudinally extending channel 26 is formed in the inside face of each cross web 14. The transverse distance between strips 20, 20 and the distance between arms 21, 21 and grooves 19, 19 is substantially the same, and proportionally is of the ratio of about 1:2 of the outside transverse dimension of the frame member. We have found the ratio of 5:11 to be very effective.

Frame legs 13 are coupled to each other by angular coupling clips 27 which are formed of resilient wire rod, each coupling clip 27 engaging a corresponding pair of end sections of adjacent channels 24. Each clip 27 includes a pair of arms 30 perpendicular to each other and registering with corresponding channels 24, each arm 30 terminating in angularly related fingers 32, the junction of which bears on a corresponding shoulder 23 (see FIGURE 2), and the opposite ends of which bear on the rear face of the corresponding leg 21 thereby to effect a resilient frictional engagement between coupling arms 30 and channels 24. A flexible steel band 33 nests in and extends along channels 26 and tightly encircles frame 11. The ends of band 33 project through a pair of longitudinally spaced openings 34 formed in one of the channel member cross webs 14, from the front to the rear face thereof, and the ends of the band are connected by a clinched fastening collar 36 to lock legs 13 securely in the frame-assembled condition. The collar 36 is commonly employed in connecting the ends of a baling band and a conventional band tightening and collar clinching tool may be used in stretching and securing the ends of the band 33. As will be readily appreciated, other means of securing the channel members may be employed, as welding, corner brackets or the like.

The borders of panels 12 confront the outside faces of channel legs 16 and the edges thereof coincide with the front outside edges of the arms 21 whereby to fully close and hide the openings to channels 24. The panels may be secured to frame legs 16 as by gluing or cementing or by a strip or tape 37 carrying an adhesive coating 38, preferably of the pressure sensitive type, on opposite faces thereof and sandwiched between the confronting faces of each panel 12 and corresponding channel legs 16. Each panel 10 is thus easily assembled and is in the form of a thick double walled panel unit having a coupling track along each side thereof as defined by a corresponding channel member 13.

Cooperating with panel unit 10 in order to facilitate the assembly of one or more panel units and the support and mounting thereof are coupling members which may be adjustably positioned along the trackway and releasably locked in any desired position. A coupling member 40 which may be employed to advantage is illustrated in FIGURES 4, 5, and 6 and comprises an elongated mounting bar 41 of a width slightly less than the distance between the confronting faces of the channel strips 20 but more than the distance between shoulders 18.

Mounting bar 41 separably registers with the trackway and is slidable along the length thereof and is provided along its opposite longitudinal edges with rearwardly projecting ribs 42 which complement grooves 19 and, in a coupled condition, register therewith.

A circular opening 43 is formed in bar 41 adjacent each end thereof and supports a cam bar locking assembly 45 which includes a shaft 44 rotatably engaging each opening 43 and provided at its outer end with a hex-socketed head 46 and at its inner end with a threaded coaxial shank 47 of reduced diameter. A lock or cam bar 48 of parallelogram configuration is provided with a tapped central bore 49 which is engaged by threaded shank 47. The opposite, wide angle, corners 50 of cam bar 48 are bent rearwardly to provide cam surfaces 51 on the front face of the cam bar which surfaces 51 are forwardly inclined from corners 50. The width of cam bar 48 is less than the space between the edges of shoulders 18 and the length thereof is greater than such space and cam bar 48 is of such shape that the ends thereof abut and extend along the inside faces of channel legs 16 when the cam bar is turned to its locked position. In the locked position of cam bar 48, as shown in FIGURES 5 and 6, shoulder 18 is tightly engaged by the raised face of cam bar 48 and corners 50 are spaced rearwardly thereof and the grooves 19 are tightly engaged by the ribs 42. In securing coupling member 40 to a track 39, cam bars 48 are turned parallel to mounting bar 41 and the mounting bar then positioned in the track with ribs 42 engaging grooves 19. Cam bars 48 are then turned by means of hex heads 46 to their locked positions by means of a suitable hex-type wrench. Cam bars 48 may be spaced from ribs 42 by spacer collars 52 registering with shafts 44 between the confronting faces of cam bars 48 and mounting bar 41, and a resilient compression washer or washers 53 registers with each of the shafts 44 and is entrapped between bar 14 and shaft heads 46.

Formed in mounting bar 41 intermediate the ends thereof is a multi-splined bore 54. A connector element 56 includes a short cylindrical rod 57 provided at opposite ends thereof with a similarly splined axial shank 58 which is of length slightly less than that of bore 54 and a tapped axial bore 59 is formed in each shank 58. A splined shank 58 is inserted into mating registry with bore 54 and releasably locked therein by a screw 60 engaging the tapped bore 59 and provided with a head 61 bearing on the rear face of mounting bar 41. The opposite splined shank 58 may be fastened in a like manner to mounting bar 41 of another coupling member 40, the angular relationship of the bars 40 and hence of panel members 10 which are mounted thereto being adjustable by adjusting the axially angular position of the connector member 56 in the respective mounting bars 41. The number of splines may be varied thereby to predetermine the angular relationships possible. In FIGURE 4 ten splines are shown while in FIGURE 7 fifteen are shown, these numbers being merely illustrative. For certain arrangements, as for instance that of FIGURES 26 and 27, the connecting element need not be splined and the bores through bars 40 need not be splined. The longitudinal spatial relationship of panel units 10 coupled as aforesaid may be adjusted by longitudinally adjusting coupling members 40 in corresponding tracks 39, such adjustment being permitted by turning cam bars 48 to their unlock positions.

Various forms of panel unit coupling assemblies may be provided which facilitate the assembly of panel units 10 in different spatial arrangements. Thus, in FIGURE 4a of the drawing there is illustrated an angle-shaped mounting bar 63 which permits the joining of a pair of panel units in a common plane and arranged longitudinally end to end and laterally offset or correspondingly positioned. Coupling bar 63 includes a pair of legs 64 which are at right angles to each and connected by an inclined intermediate leg 65. Each of the legs 64 is provided with opposite outwardly directed ribs 66 extending along the sides of legs 64 and complementing grooves 19. A circular opening 67 is formed in each leg 64 corresponding to opening 43 and engaging a corresponding shaft 64 of a cam locking assembly 45 described above. In employing coupling and mounting bar 63 each leg 64 is brought into engagement with a track 39 of a respective panel unit 10, as aforesaid, the units 10 slide relative to each other to their desired positions and the bar 63 is then fixed by turning the cam bars 48 to their lock positions.

In FIGURE 4b there is illustrated a coupling device 68 for assembling a pair of panel units 10 at right angles to each other and in any desired longitudinally offset relationship. Coupling 68 includes an angle member provided with a pair of plate legs 69 forming a right dihedral angle, it being understood that legs 69 may form any desired angle, and that more than two legs may be provided. A pair of parallel elongated mounting bars 70 are affixed to the free ends of legs 69 and are of the configuration of mounting bar 41, being provided with outwardly directed longitudinal ribs along its side edges and the bar rib carrying faces being at right angles to each other. A pair of openings 71 are formed in each bar 70 adjacent the ends thereof and support cam bar locking assemblies 45. In employing coupling device 68 a mounting bar 70 is inserted into engagement with a corresponding frame track 39 and adjusted to the desired position along the length thereof and then set by tightening the respective cam locking assemblies 45.

Two or more panel units 10 may be assembled in predetermined angularly related positions radiating from a common axis by employing the coupling bar members illustrated in FIGURE 8. Coupling member 72 includes three connected coplanar mounting arms 73 radiating from a common center and forming angles of 120° to each other as in FIGURE 26. Each mounting arm 73 is provided with longitudinal coupling ribs and an aperture 74 which holds a cam locking assembly 45. By positioning each arm 73 into the end of a corresponding panel unit track 39 and tightening the locking cam assemblies, three panel units 10 may be joined along substantially coinciding edges and radiate from a common axis at relative angles of 120°. By employing coupling member 76 which is provided with four radiating mounting arms 77 at right angles to each other and similar to the mounting arms 73, four panel units 10 may be assembled, radiating from a common axis and at right angles to each other. Where it is desired to assemble a pair of panel units to form a dihedral angle, coupling member 78 may be used which includes a pair of angularly related mounting arms 79, as in FIGURES 26 and 27. It is understood that coupling members having any desired number of arms angularly related in any desired manner may be employed.

A unique connector unit for joining two or more panel units 10 in many angular and spatial connected relationships or for joining auxiliary devices or supports thereto is illustrated in FIGURES 9 and 10 and is designated by reference numeral 80. Connector 80 includes an annular coupling element or knuckle defining hinge ring 81 provided with an axial bore 82, the lower end of which is enlarged to define a well 83 having a flat base or shoulder 84 and an upwardly inwardly inclined or tapered peripheral face 86 of frustoconical configuration. The upper end of bore 82 is countersunk to receive the head of a connecting screw. The upper section 87 of coupling element 81 is a projection of frusto-conical configuration, coaxial with and complementing well 83, the peripheral wall 88 thereof corresponding to the peripheral wall 86 of the well and the top shoulder thereof being flat. The height of projection 87 is about equal to the depth of well 83 and the diameter of its base is slightly greater than that of the entrant opening to well 83 to insure the frictional engagement between surfaces 86 and 88 of a mating projection 87 and well 83 of a pair of coupled elements 81 as illustrated in FIGURE 10, with the other surfaces thereof being mutually spaced.

A post 89 is integrally formed with and projects radially from the lower section of coupling element 81 and is spaced from the upper section thereof by a groove 90 for accommodating the wall of well 83 of a coupled unit 81. Post 89 terminates in a splined coaxial shank 91 which mates with mounting bar splined aperture 54. A tapped axial bore 92 is formed in shank 91 and receives a mating screw which permits the locking of a connector unit 80 to a mounting bar 41 in an adjusted axial angular relationship in the manner of connector element 56.

Two or more connector units 80 may be assembled for angular adjustment about their common axis by nesting the frusto-conical projection 87 of one of the connector units 80 in the well 83 of the next adjacent connector unit 80. A stack of two or more connector units are maintained in assembled condition by a screw 94 engaging bores 82 and having a head 96 nesting in the countersunk section of a bore of corresponding end unit 80 and a threaded shank engaged by a lock nut 84 nesting in well 83 of an opposite end connector unit 80. It has been found highly advantageous to provide the conical surfaces 83 and 88 at an angle to the axes thereof of between about 1° more and 4° less than the angle of repose of the material forming these conical surfaces. The connector units 80 being preferably formed of metal the aforesaid angle is advantageously between 5° and 20° with the connector units 80 shaped as aforesaid hand tightening as with a hex-wrench of screw 96 is adequate to maintain stacked connector 80 units in their adjusted positions while permitting their easy relative angular adjustment. By use of connector units 80 with mounting bars 41 a pair of panel units 10 can be joined in many desired universally adjusted angular relationships and in many desired mutually offset positions. Moreover, a number of panel units 10 may be interconnected by a stack of a corresponding number of connector units in a great variety of spatial and angular relationships.

In FIGURE 11 of the drawings there is illustrated a modified form of channel section 99 which may be employed to advantage in place of channel legs 13 forming frame 11. Channels 99 are assembled and connected in the manner of channel legs 13 to form a panel frame member and each includes a rear longitudinally extending cross web 100 provided with forwardly directed side legs 101 spaced inwardly from the edges of the web 100 to delineate outwardly directed toes 102 and a strap channel 103. Channel 103 may receive electrical fittings. Directed outwardly from legs 101, between the front and rear edges thereof, are strips 104 which join at their outer ends parallel side walls 106 projecting forwardly of strips 104 and including sections 107 which project rearwardly of strips 104 and terminate in an inwardly directed flange 108 coplanar with toes 102. Elements 102, 104, 107 and 108 delineate tracks 109 having constricted openings thereto by which auxiliary elements may be locked along the inner periphery of the frame.

Directed inwardly from the forward ends of side walls 106 are arms 110 which are joined at their inner ends to rearwardly projecting fingers 111 terminates in inwardly directed flanges 112. Flanges 112 include rearwardly facing coplanar shoulders 113 corresponding to shoulders 18 and forwardly facing grooves 114 corresponding to grooves 19 and which similarly define a trackway. A shoulder 116 is directed outwardly from the rear section of each finger 111 to delineate therewith and with arms 110 and walls 106 connector clip accommodating channels 117.

A plurality of channel members 109 are assembled into a frame in the manner of the assembly of frame legs 13, adjacent angularly related channels 117 being engaged by coupling clips 118 of the construction of coupling clips 29 and the assembled frame may be locked in position by an encircling strap 119 registering with the channel 103. The units defined by frame-forming members 99 may be employed in the manner of the panel units 10 or as frames for retaining shelves, photo transparencies, etc.

An arrangement which may be advantageously employed for supporting one or more panel units is shown in FIGURE 12 and includes a post or column 121 of square transverse cross section having longitudinal tracks formed in the sides thereof. Post 121 includes a medial lateral cross web 123 joined at its ends to the medians of laterally spaced parallel transverse legs 126. Projecting from the ends of each leg to adjacent corners of post 121 are diagonal webs 127 which terminate in diverging flanges 128 at right angles to each other and defining the sides of post 121. The free ends of flanges 128 along common sides of post 121 are spaced from each other to define longitudinal openings 129 to tracks 122. Suitable means may be provided for supportnig the post 121 in any desired position.

Each track 122 is delineated by a pair of spaced coplanar shoulders 130 parallel to a corresponding side face of post 121 and formed at the respective ends of legs 126, adjacent faces of diagonal webs 127, inside faces of corresponding flanges 128, and inwardly facing shoulders 131 formed at the free inside ends of flanges 128 and slightly outwardly offset relative thereto. In order to connect a panel unit adjustably, such as a panel unit 10, to post 121 there is provided a longitudinally bowed leaf spring clip 132 which registers with a corresponding track 122 and is entrapped between and stressed by a respective set of confronting shoulders 130 and 131 which engage opposite longitudinal borders of spring clip 132. Spring clip 132 is connected by means of a suitable fastener to a mountnig bar coupled to a panel unit in the manner earlier described.

An auxiliary unit in the form of a lighting unit 134 which may be employed with the present arrangement is illustrated in FIGURE 13 and includes posts as 136 projecting from the outer face of a mounting bar 137 and secured thereto by means of screws 138, mounting bar 137 being provided with a locking assembly 45. Posts 136 have a splined transverse opening formed in the upper section thereof which is engaged by a corresponding splined shaft 140 carried by a leg 139 to permit the angular adjustment of leg 139 about the axis of shaft 140, screw means being preferably provided to lock the splined bore and shaft releasably in mating engagement. Arm 139 is provided with a section of reduced cross-section which snugly telescopes and supports a forwardly projecting support arm 141 carrying at its free end any suitable lighting fixture including a reflector 142. Lighting unit 134 may be coupled to a panel unit by means of mounting bar 137 and may be readily angularly and laterally adjusted as desired.

In FIGURES 14 to 16 there is illustrated a panel structure provided with means for releasably supporting supplementary panels. A panel 143 forming part of a panel unit such as a panel 12 is in the form of a perforated rigid sheet having longitudinally and transversely spaced apertures 144 formed therein. The apertures may be overlaid by a suitable covering material 152. Carried by panel 143 are two fixed panel brackets 149 and two adjustable brackets 156 arranged along the sides of a supplementary panel 148, it being understood that the position of brackets 149, 156 may be changed as desired. Panel 148 may be formed of any suitable material as for example cardboard, and may bear any desired information, illustrations, etc. The number and positions of fixed and adjustable brackets may be varied to accommodate displays of different dimensions. Each fixed bracket 149 includes a plate superimposed at a desired position on panel 143 and secured thereto by spring rivets or fasteners 149 registering with openings formed in the plate and aligned apertures 144. Integrally formed along the outer edge of each of the plates and slightly forwardly offset relative thereto is an elongated channel member 150 having an inwardly facing opening 151. Each bracket 156 includes a track member comprising an apertured rear plate secured to panel 143 in the manner of the bracket plates 149 and flanges 153 secured to and extending along the sides of the plate and forwardly offset relative thereto, flanges 153 being directed toward and spaced from each other. A resilient plate 154 slidably abuts plate 152 and is retained thereon and limited to longitudinal movement by the flanges 153 engaging the front borders of slide plate 154. The lower section of plate 154 is outwardly bowed as at 156 and sprung resiliently to retain slide plate 154 in a preset position along plate 152 by its resilient bearing on flanges 153 and plate 152. Integrally formed along the outer edge of plate 154 and slightly forwardly offset relative thereto is a channel member 157 having an inwardly facing opening.

In employing the supplementary panel support arrangement described above, a panel 148 may be applied thereto either by partially or fully slidably withdrawing bracket plate 154 from the support plate 152 and flanges 153, inserting a panel 148 with its borders engaged by the bracket channels 150 and thereafter resetting the plate 156 to bring the channel member 157 in engagement with the corresponding border of the panel 148.

In FIGURE 17 of the drawings there is illustrated an arrangement for mounting a panel unit 10 which includes a pair of laterally spaced parallel vertical stands 158 each of which includes a vertical hollow post 159 and a pair of diverging legs 160 depending therefrom and carrying vertically adjustable foot pieces 161 at the bottoms thereof. A mounting bar 163 engages the lower sections of opposite tracks of the panel unit frame and is secured thereto by a pair of locking assemblies 45, as earlier described. Mounting bar 163 is provided with a longitudinal depending shank 164 which telescopes post 159 and is releasably locked thereto by means of set screws 165 carried by post 159.

A structure for vertically supporting one or more panel units for swinging about a common vertical axis is illustrated in FIGURE 20 and includes a tubular vertical post 166 which is suitably supported in any desired manner. A first coupling member 167 comprises a tubular shank 168 which telescopes the upper end of post 166 and is provided at its top with a peripheral flange resting on the upper end of post 166. A mounting bar 169 is integrally formed with and projects radially from the upper end of shank 168 and is of the same cross-section as mounting bar 41 and includes upwardly facing ribs and an aperture 170 which engages a locking assembly 45. A second coupling member 171 includes a vertical cylindrical shank 172 which rotatably telescopes shank 168 and has integrally formed therewith, a mounting bar 173 projecting radially from the upper end thereof, mounting bar 173 being similar to mounting bar 169. In use, mounting bars 169 and 173 are coupled to end bottom tracks of respective panel units and locked thereto to support panel units vertically for swinging about a common vertical axis or they may be arranged in longitudinal alignment anywhere along a panel edge.

A panel unit may be supported in an inclined position by employing a pair of leg members 174 as in FIGURES 18, 19. Each leg 174 includes an elongated bar 176 having a suitable foot piece as 177 positioned at the lower end thereof and projecting therefrom. A transverse splined recessed opening is formed in the upper end of bar 176 and has releasably affixed therein a mounting element comprising a transversely projecting splined hollow collar 178. An elongated lock screw 179 is provided extending through and past collar 178 terminating in a threaded shank 180. In use, the splined rods 178 are releasably locked in registry with the splined openings 54 in the mounting bars 41 by means of suitable threaded nuts engaging the free ends of threaded shanks 180, and the leg carrying mounting bars are locked in the desired position along opposite tracks of a panel unit. The angle of inclination of the supported panel unit may be adjusted by varying the angles of the legs 174 about or with the splined rods 178.

A simplified modified panel unit is shown in FIGURES 21 and 22 and includes a polygonal panel member 181 having grooves 182 of triangular transverse cross section formed along the borders thereof. A clamp unit 183 releasably engages a border of panel 181 and is slidable adjustable along the length thereof. The clamp unit is channel shaped and includes a cross web 184 and resilient parallel clamping side legs 186 terminating in longitudinal ribs 187 directed toward each other and complementing the grooves 182. In order to facilitate the relative movement of legs 186, grooves 188 are formed along their inner inside faces adjacent web 184 and a clamping screw 189 passes through an opening in one of legs 186 and engages a tapped aligned opening in the other of the legs. A longitudinal channel is formed in the inner face of web 184 and a mounting bar 190 is engaged thereby and locked thereto in any suitable manner. Bar 190 may cooperate, be associated with and may be provided with any of the connector devices associated with the mounting bar 41 as hereinabove described, for example, units 56, 80, 63, 68, 171, etc. The manner of employing the panel 181 is similar to that of the panel unit 10, the position of the coupling bar 190 along a corresponding border of the panel 181 being readily adjustable by loosening the screw 189 and sliding clamp 183 along the panel border and thereafter tightening screw 189.

In FIGURES 23 to 27 of the drawings there are illustrated various structural assemblies employing the present modular system. Thus in FIGURE 23, a post of the construction illustrated in FIGURE 12 is suitably supported between the floor and ceiling by means of conventional vertically adjustable end pieces 191 which engage the floor and ceiling. A first pair of oppositely directed lower panel units 10 are supported in opposite post tracks 122 by means of spring members 132 and a second pair of oppositely directed upper panel units 10 arranged in quadrature to the lower first panel units and are supported in a like manner. FIGURE 24 illustrates the manner in which the stands 158 shown in FIGURE 17 may be employed vertically to support a panel unit, stand 158 being coupled to the tracks of the panel unit and projecting below the bottom edge thereof.

In FIGURE 25 there is illustrated an assembly of vertical panel units wherein the connector units 80 may be employed to advantage, each connector unit 80 being connected to a corresponding panel unit by a coupling assembly 40. Thus, a vertical panel unit 10a is connected to an angularly related vertical panel unit 10b along adjacent edges by means of vertically spaced pairs of stacked interconnected coupling units 80a, and panel unit 10b is connected along a remote vertical edge to another vertical angularly related panel unit 10c by means of vertically spaced pairs of stacked interconnected coupling units 80b. A pair of angularly related vertical panel units 10d is joined along adjacent edges to a vertical edge of panel unit 10c remote from panel unit 10b by a pair of vertically spaced stacked sets of three connector units 80c. Connectors 80a, 80b, and 80c are similar to connector unit 80 and panel units 10a, 10b, 10c and 10d are similar to panel unit 10 or any of the others described above.

In FIGURE 26 there is illustrated an assembly of panel units of end to end opposite dihedral pairs thereof. This assembly may be effected in various ways within our system. For example, panel units 10e and 10f of each pair may be coupled in a dihedral relationship by means of coupling bars 78 described above registering with adjacent tracks of the panel units, while, when a third panel as 10g is included (also as in FIGURE 26), coupling spider 72 is employed. Bar assemblies with unsplined connectors are employed at the points of intersection of panels 10c, 10f. The structure illustrated in FIGURE 27 may be assembled in the manner of that shown in FIGURE 26 and is obvious from the above. It should be noted that where successive panels project from a common axis they may be joined by pairs of coupling units 80 or connectors as 68, 72, 76, 78. The arrangements of FIGURES 23 to 27 illustrate merely by way of example the present modular system as being capable of rapid and easy assembly and erection into a great variety of structures, including partition walls and the like and including electrical fittings and outlets, the latter being achieved by positioning multi outlet-containing elements within strap channels 103 or channels 26.

While there have been described and illustrated preferred embodiments of the present invention, it is apparent that numerous alterations, omissions and additions may be made without departing from the spirit thereof.

What is claimed is:

1. A modular structure comprising a polygonal frame member the sides of which are formed of channel members having abutting ends and provided with an inner cross web and outwardly directed legs delineating longitudinally extending tracks, an assembly band extending peripherally about said frame member and along the lengths of the sides thereof and tightly encircling the outer faces of said channel member webs and having the ends thereof secured to each other, and a coupling member registrable with and adjustable along the length of a track and provided with means for releasably locking said coupling member to said channel member in a preset position along a corresponding track.

2. The structure of claim 1, wherein one of said channel member cross webs has openings formed therein, the ends of said band projecting through said opening and being connected to each other at the inner face of said respective cross web.

3. A modular structure comprising a polygonal panel, a correspondingly shaped polygonal frame having sides extending along the full periphery of said panel and secured corresponding borders of said panel and formed of channel members having inwardly disposed cross webs and outwardly directed legs delineating corresponding tracks and provided with pairs of inwardly facing opposite shoulders extending along the inside faces of said channel legs and spaced from said cross web, a coupling member including a clamping bar having a width less than the distance between opposite shoulders and a length greater than said distance and separably registrable with a track inside a respective pair of opposite shoulders, and a clamping member rotatably supporting said clamping bar and engageable with said respective track exterior of said respective opposite shoulders, means for rotating said clamping bar relative to said clamping member.

4. The structure of claim 3, including a second polygonal panel similar to said first recited panel and spaced transversely from and parallel to said first recited panel and having borders secured to corresponding sides of said polygonal frame.

5. The structure of claim 3, including grooves extending along the lengths of the inner faces of said frame channel members.

6. A modular structure comprising a polygonal panel, a polygonal frame having sides extending along and secured to corresponding borders of said panel and formed of channel members having inwardly disposed cross webs and outwardly directed legs delineating corresponding tracks and provided with pairs of inwardly facing opposite shoulders extending along the inside faces of said channel legs and spaced from said cross web, a coupling member including a clamping bar having a width less than the distance between respective opposite shoulders and a length greater than said distance and separably registrable with said corresponding track inside said respective pair of opposite shoulders, a mounting member rotatably supporting said clamping bar and engageable with said track exterior of said respective opposite shoulders, means for rotating said clamping bar relative to said mounting member, said mounting member having a splined aperture formed therein, a coupling element including a post having a splined shank mating and separably engaging said splined aperture, and means releasably locking said post to said mounting bar.

7. The structure of claim 6, wherein said post is provided with splined shanks at opposite ends thereof.

8. The structure of claim 6, wherein said connector element includes a knuckle-defining hinge ring mounted on the outer end of said post and including a second connector element swingably coupled to said hinge ring, and means releasably locking said second connector element to said hinge ring in an adjustable angular position.

9. The structure of claim 6, wherein said connector element includes a first knuckle-defining hinge ring mounted on the outer end of said post and having an axial bore provided at an end thereof with a first enlarged well having a tapered inner peripheral face and an axial frusto-conical projection at the opposite end thereof having a tapered outer peripheral face mating said tapered inner peripheral face, and a second connector element including a second knuckle-defining hinge ring similar to said first hinge ring, a tapered projection of one of said rings being in separable mating engagement with a tapered recess of the other of said rings, and means releasably locking said rings in an adjustable angular relationship.

10. A modular structure comprising a polygonal panel, a polygonal frame having sides extending along and secured to corresponding borders of said panel and formed of channel members having inwardly disposed cross webs and outwardly directed legs delineating corresponding tracks and provided with pairs of inwardly facing opposite shoulders extending along the inside faces of said channel legs and spaced from said cross web, a coupling member including first and second clamping bars each having a width less than the distance between opposite shoulders and a length greater than said distance and separably registrable with said corresponding track inside said respective pair of opposite shoulders, a mounting member rotatably supporting said clamping bars and engageable with said track exterior of said respective opposite shoulders, means for rotating each of said clamping bars relative to said mounting member, said clamping bars being disposed adjacent opposite ends of said mounting bar, and a coupling element located on said mounting member between the ends thereof.

11. A modular structure comprising a polygonal panel, a polygonal frame having sides extending along and secured to corresponding borders of said panel and formed of channel members having inwardly disposed cross webs and outwardly directed legs delineating corresponding tracks and provided with pairs of flanges directed toward each other and having inwardly facing opposite shoulders extending along the inside faces of said channel legs and spaced from said cross web and outwardly directed faces, a coupling member including a clamping bar having a width less than the distance between opposite shoulders and a length greater than said distance and separably registrable with said corresponding track inside said respective pair of opposite shoulders, a mounting member rotatably supporting said clamping bar and engageable with said track exterior of said respective opposite shoulders, means for rotating said clamping bar relative to said mounting member, said outwardly directed flange faces having longitudinally extending grooves formed therein and said mounting bar being provided along the sides of the rear face thereof with longitudinally extending ribs mating and separably engaging said grooves.

References Cited

UNITED STATES PATENTS

| | | | |
|---|---|---|---|
| 1,150,455 | 8/1915 | Rudolph et al. | 287—189.36 |
| 1,849,811 | 3/1932 | Smiley | 287—189.36 X |
| 2,893,067 | 7/1959 | Meek | 52—580 |
| 2,894,576 | 7/1959 | Williams | 160—220 |
| 2,928,512 | 3/1960 | Slater et al. | 248—243 X |
| 2,933,167 | 4/1960 | Keller | 52—580 |

FOREIGN PATENTS 895,149   5/1962   Great Britain.

DAVID J. WILLIAMOWSKY, *Primary Examiner.*

HARRISON R. MOSELEY, *Examiner.*

PETER M. CAUN, *Assistant Examiner.*